United States Patent [19]
Smith

[11] Patent Number: 6,002,340
[45] Date of Patent: *Dec. 14, 1999

[54] SMART SWITCH

[75] Inventor: Robert L. Smith, Milpitas, Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/599,030

[22] Filed: Feb. 9, 1996

Related U.S. Application Data

[63] Continuation-in-part of application No. 08/183,196, Jan. 14, 1994, abandoned.

[51] Int. Cl.⁶ .................................................. G05B 23/02
[52] U.S. Cl. .............................. 340/825.06; 340/825.18; 455/151.4; 364/483
[58] Field of Search ........................ 340/825.06, 825.18; 455/151.4; 364/492, 483, 707, 188; 307/64, 66; 361/42, 45; 395/750

[56] References Cited

U.S. PATENT DOCUMENTS

| | | |
|---|---|---|
| 4,141,006 | 2/1979 | Braxton . |
| 4,206,444 | 6/1980 | Farlan ..................................... 340/147 |
| 4,701,946 | 10/1987 | Oliva ........................................ 379/98 |
| 4,723,269 | 2/1988 | Summerlin . |
| 4,740,883 | 4/1988 | McCollum ............................. 364/140 |
| 4,747,041 | 5/1988 | Engel ...................................... 364/200 |
| 5,012,233 | 4/1991 | Poulsen .............................. 340/825.18 |
| 5,198,806 | 3/1993 | Lord .................................... 340/825.31 |
| 5,289,045 | 2/1994 | Lavin ....................................... 307/64 |
| 5,396,636 | 3/1995 | Gallagher ................................ 395/750 |
| 5,404,541 | 4/1995 | Hirosawa ................................ 395/750 |
| 5,408,668 | 4/1995 | Tornai ..................................... 395/750 |
| 5,475,295 | 12/1995 | Hong . |
| 5,477,476 | 12/1995 | Schanin .................................. 364/707 |

FOREIGN PATENT DOCUMENTS

| | | |
|---|---|---|
| 0176342 | 9/1985 | European Pat. Off. . |
| 0 176 342 | 4/1986 | European Pat. Off. . |
| 0 373 278 | 6/1990 | European Pat. Off. ........ G06F 1/100 |
| 0 508 685 A2 | 10/1992 | European Pat. Off. .......... G06F 1/26 |
| WO 93/19415 | 9/1993 | WIPO .............................. G06F 1/26 |

OTHER PUBLICATIONS

IBM Technical Disclosure Bulletin, vol. 32, No. 7, Dec. 1, 1989, pp. 347–349, XP000078124 "Improved Data Reliability and Reducing Cabling Hardware".

*Primary Examiner*—Michael Horabik
*Assistant Examiner*—Anthony A Asongwed
*Attorney, Agent, or Firm*—Blakely Sokoloff Taylor & Zafman

[57] ABSTRACT

A configurable remote controller for remotely sensing the status(es) of one or more electrically-powered target systems and for altering the status(es) of the target systems in response. In one embodiment, the remote control device is coupled to a preexisting communication channel established between a command system and one or more target systems. A system administrator transmits control instructions over the pre-existing communication channel to the remote controller. The remote controller receives and processes the control instructions as well as senses for a change in the status of at least one of the target systems. If a change in status is detected, then the remote controller alters the status in accordance with the control instructions. The change can be a lowering of the voltage level in which disconnecting the one target system from the power source can be considered a form of altering the status.

19 Claims, 12 Drawing Sheets

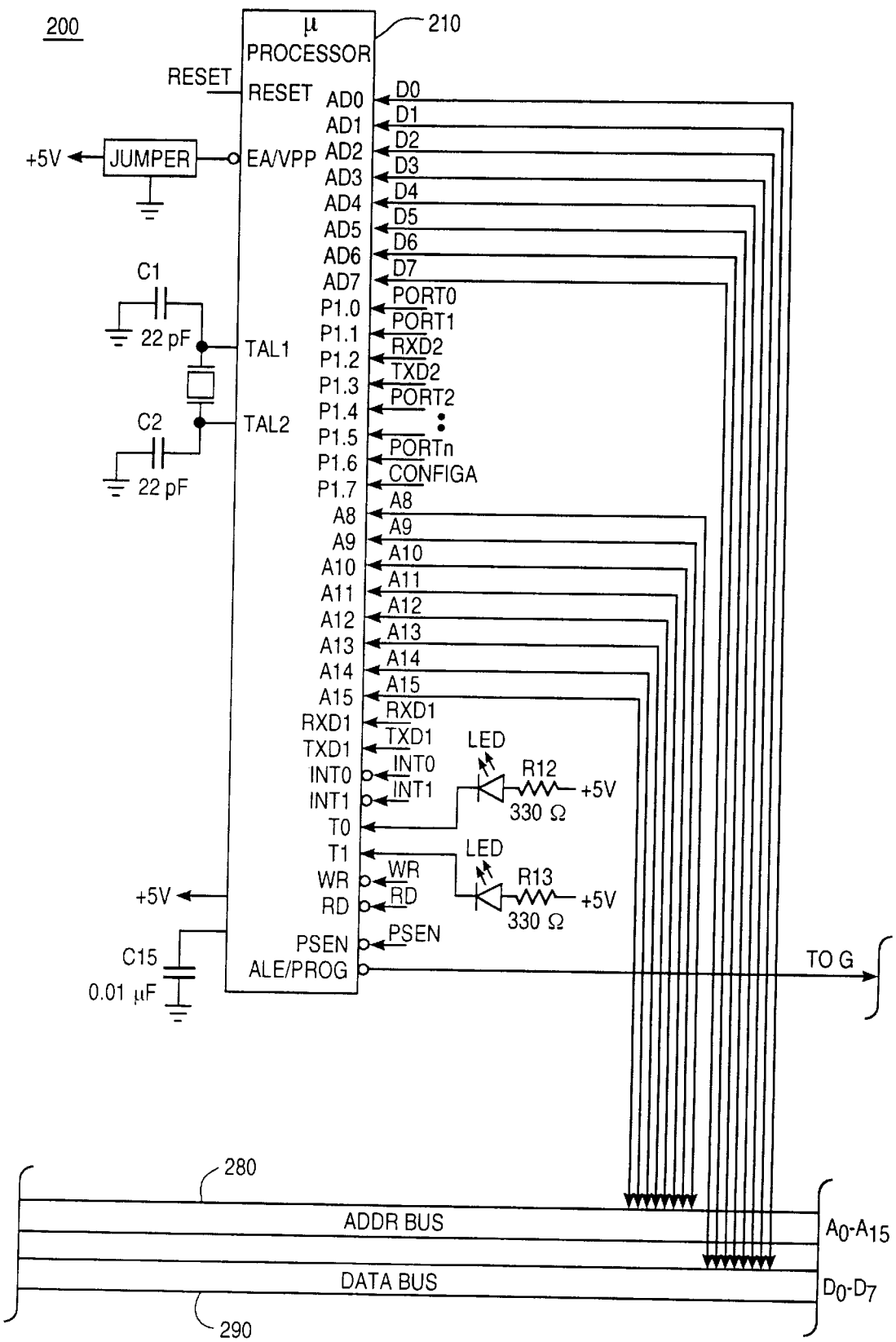
FIG. 2A  FIG. 2B →

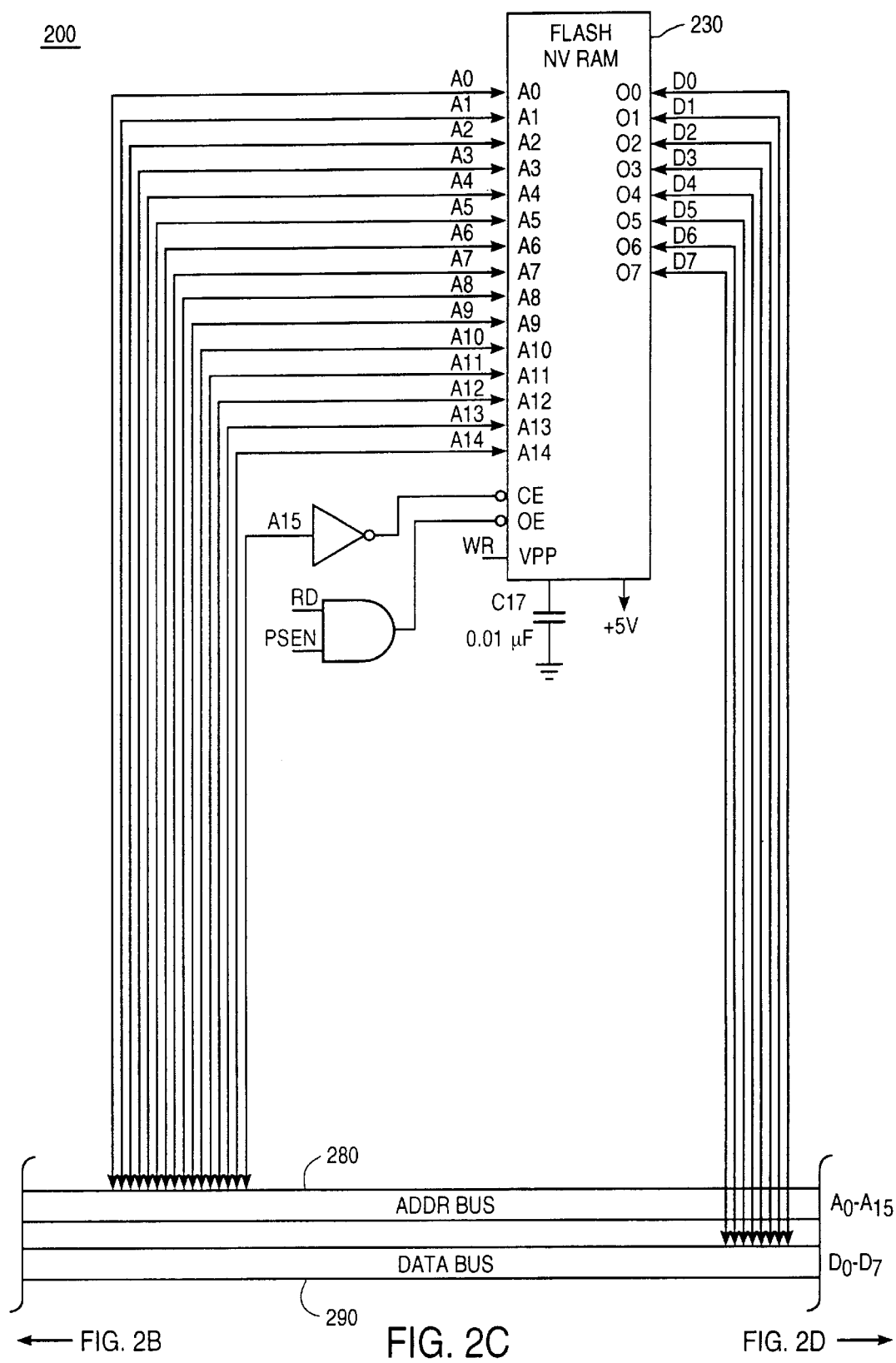

SMART SWITCH

This application is a continuation-in-part of application Ser. No. 08/183,196, filed Jan. 14, 1994, incorporated herein by reference in its entirety.

BACKGROUND OF THE INVENTION

1. Field of the Invention

This invention relates to the field of remote control. More particularly, the present invention relates to the field of remotely monitoring and controlling target system(s).

2. Description of the Related Art

Field service and maintenance of electrically-powered systems, e.g., database or video servers, at remote locations is generally a labor-intensive and hence an expensive activity. For example, after a power outage has occurred at a remote location, it is often necessary to power up the various systems in a particular order or sequence in order to minimize the risk of damaging the hardware and/or software/data of these systems. An exemplary conventional remote control device is disclosed in the parent application cited above.

Although conventional remote control devices are available for pre-defined installations, they are very limited in capability and not easily reconfigurable. Typically, commercially-available remote control devices are accessed by a system administrator via a pair of modems and a telephone line. Typically, these remote control devices are capable of remotely powering up/down a system or a bank of systems simultaneously, under the direct control of the system administrator.

Unfortunately, the system administrator or a service personnel has to visit the remote location each time a new system is added/deleted or when the existing systems need to be reconfigured. This is because, typically, each remote control device is dedicated to a single system or a bank of systems. As a result, these remote control devices are inflexible in their control of the systems.

Hence there is a need for a versatile, easily-configurable remote control device that can monitor status(es) of one or more systems and provide flexibility in controlling these systems.

SUMMARY OF THE INVENTION

The present invention provides a configurable remote controller for remotely sensing the status(es) of one or more electrically-powered target systems and for altering the status(es) of the target systems in response.

In one embodiment, the remote control device is coupled to a pre-existing communication channel established between a command system and one or more target systems. A system administrator transmits control instructions via the pre-existing communication to the remote controller which receives and processes the control instructions.

The remote controller senses for a change in the status of at least one of the target systems, and if the change is detected, then the remote controller alters the status in accordance with the control instructions. In one implementation, the status is the voltage level of a primary power source associated with the one target system. The change to be detected is a lowering of the voltage level normally associated with a power outage or a brownout, and the corresponding altering step includes disconnecting the one target system from the power source.

The remote controller can also be reprogrammed using additional control instructions so that a different control sequence can be used. For example, the same primary source may be shared by several target systems and the control sequence indicate the order in which the various target systems are powered down/up.

Other statuses are possible. For example, the status to be monitored may be the ambient temperature at the remote location, and the altering step may include increasing/decreasing the air-conditioning flow rate at the remote location.

DESCRIPTION OF THE DRAWINGS

The objects, features and advantages of the system of the present invention will be apparent from the following description in which:

FIGS. 2A–E illustrate how the various components of the remote controller.

DESCRIPTION OF THE PREFERRED EMBODIMENT

In the following description, numerous details provide a thorough understanding of the present invention. These details include functional blocks and use an exemplary system status to assist one in implementing a remote controlling scheme. In addition, while the present invention has been described with reference to a specific implementation, the invention is applicable to a wide variety of electrically powered systems, architectures and environments. In other instances, well-known circuits and structures are not described in detail so as not to obscure the invention unnecessarily.

Figure 1A:
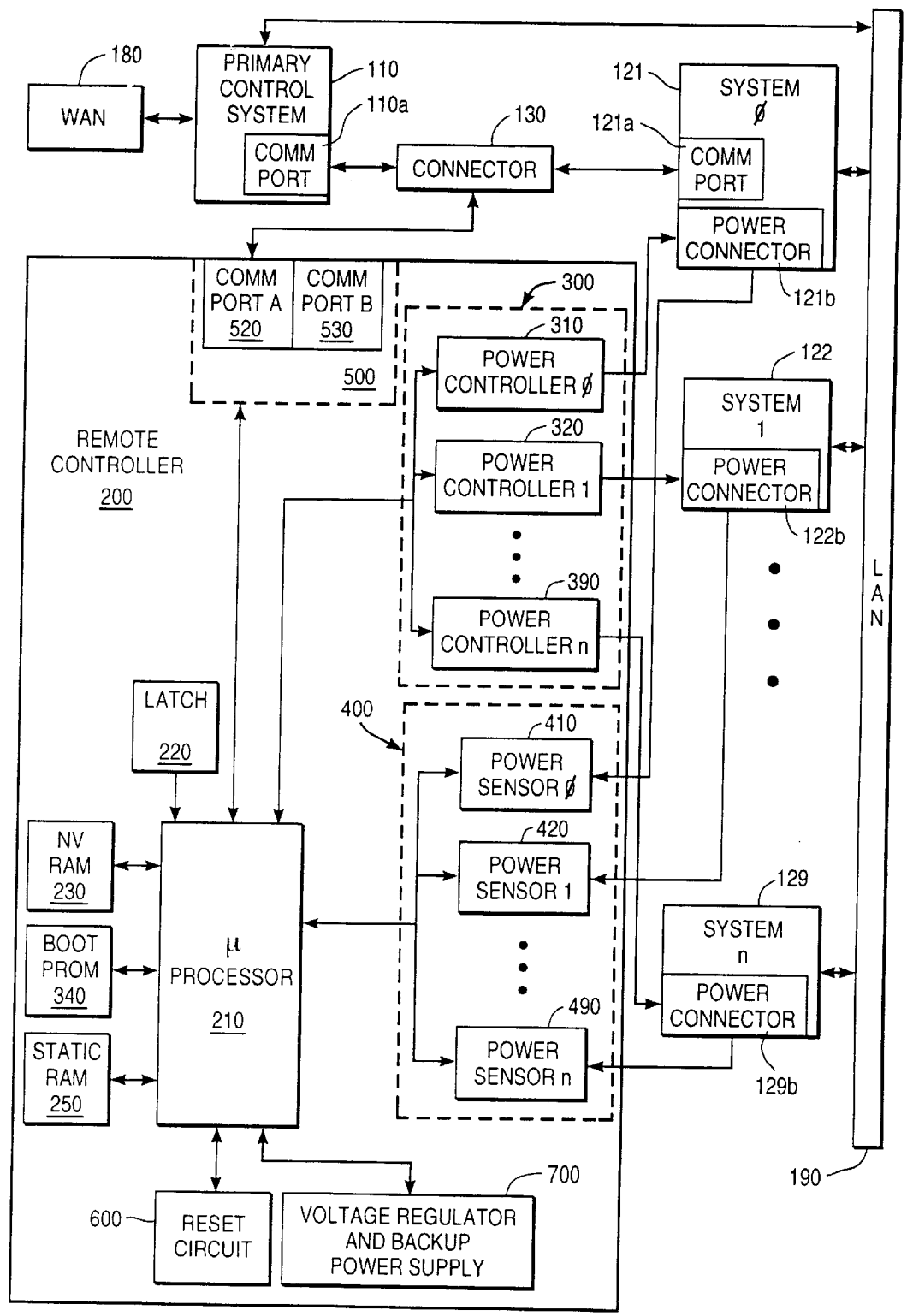
FIG. 1A is a block diagram illustrating one exemplary use of an embodiment of a remote controller of the present invention.

FIG. 1A is a block diagram illustrating one exemplary use of an embodiment of a remote controller 200 of the present invention. In this example, the status(es) being monitored and controlled by remote controller 200 is the power source (s) for a plurality of systems 121, 122, . . . 129. Other statuses such as power consumption, environmental electrical noise, and ambient/system temperature, are also possible.

Remote controller 200 includes a microprocessor 210, a latch 220, a non-volatile random access memory (NV RAM) 230, a boot programmable read-only memory (PROM) 340, a static RAM 250, a power-control circuitry 300, a power-sensing circuitry 400, a communication circuitry 500, a system reset circuitry 600, and a voltage regulator and backup power supply 700.

A primary control system 110 is coupled to system 121 via a connector 130. In this implementation, the communication protocol used for communicating between primary control system 110 and system 121 using connector 130 is the RS232 serial protocol. Remote controller 200 is able to communicate with either primary control system 110 and system 121 via a tap to connector 130.

Remote controller 200 is coupled to the plurality of systems 121, 122, . . . 129 via a corresponding plurality of power sensors 410, 420, . . . 490 and power controllers 310, 320, . . . 390. In addition, primary control system 110 and systems 121, 122, . . . 129 are coupled to each other via a local area network (LAN) 190. Primary control system 110 is also coupled to a wide area network (WAN) 180, which can be one of a number of WAN architectures, e.g., an ISDN link to a public telephone switch, a node coupled to the internet or a node coupled to a corporate-wide WAN.

In this configuration, remote controller 200 monitors the commands/responses between primary control system 110 and system 121, identifies commands/responses which are recognizable by remote controller 200 and provides appropriate control signals accordingly. The system administrator, physically located at a remote location, uses public network 180 to communicate with remote controller 200 by sending a message to primary control system 110 which then transmit an appropriate command for remote controller 200. For example, primary control system 110 may send an ASCII command string causing remote controller 200 to reprogram NV RAM 230 with a new reboot or power-up sequence for systems 121, 122, . . . 129.

Figure 1B:
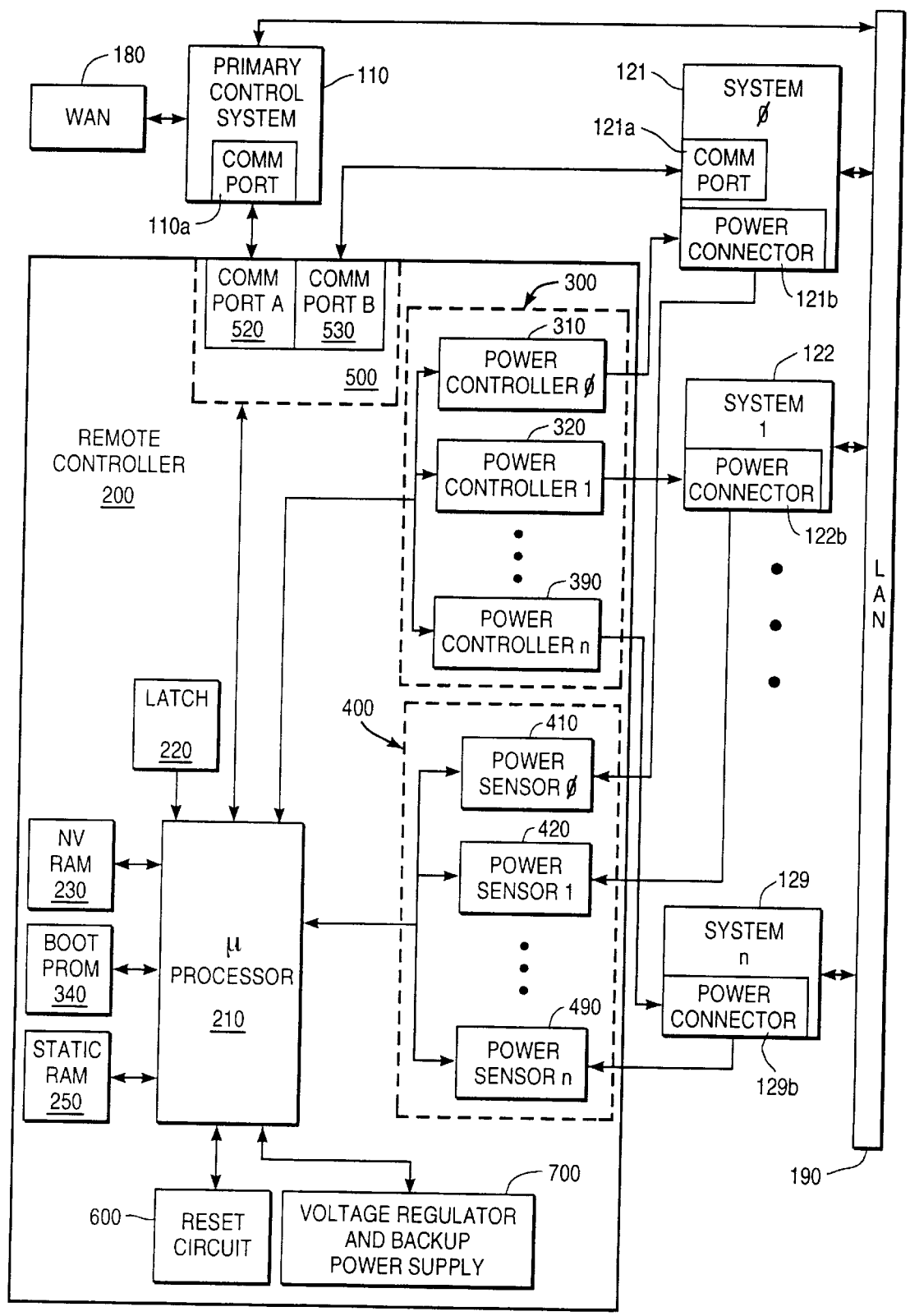
FIG. 1B is a block diagram showing the remote controller coupled in an alternate configuration with respect to a primary control system.

FIG. 1B is a block diagram showing remote controller 200 coupled in an alternate configuration with respect to primary control system 110 and system 121. In this configuration, remote controller 200 can function in the passive mode described above, i.e., monitoring but not changing the commands/responses between primary control system 110 and system 121.

Alternatively, remote controller 200 can function as an active participant in the communication between primary control system 110 and system 121. For example, instead of merely monitoring a command from primary control system 110, remote controller 200 can now receive a command from primary control system 110 and send a different command to system 121 in response. Another exemplary active mode function involves remote controller 200 logging error messages from either primary control system 110 and sending a error report to secondary system 121, or vice versa.

Other configurations are possible. For example, an additional link may be provided between WAN 180 and system 121 so that should primary control system 110 fail, system 121 can function as a secondary or backup control system accessible by the system administrator. In this configuration, system 121 can send commands towards primary control system 110 which is then monitored by remote controller 200, thereby enabling the system administrator to communicate with remote controller 200 via WAN 180 and system 121, while bypassing primary control system 110.

FIGS. 2A–E are detailed block diagrams illustrating how the various components of remote controller 200, i.e., microprocessor 210, latch 220, NV RAM 230, boot PROM 340 and static RAM 250, are coupled to an address bus 280 and a data bus 290.

Flash RAM 230 increases the programming flexibility of remote controller 200. For example, the reboot sequence for systems 121, 122, . . . 129 may be remotely selected and subsequently updated. New control sequence(s) can be added or changed to RAM 230 of remote controller 200 remotely by the system administrator via WAN 180 after installation. Flash RAM 230 also allows systems 121, 122, . . . 129 to be identified with user-selectable names which can be updated. For example, systems 121, 122, . . . 129 may be given different names according to their function. In addition, the different levels of system passwords may be used in order to preserve an audit trail of any reboot of systems 121, 122, 129.

Figure 2B:
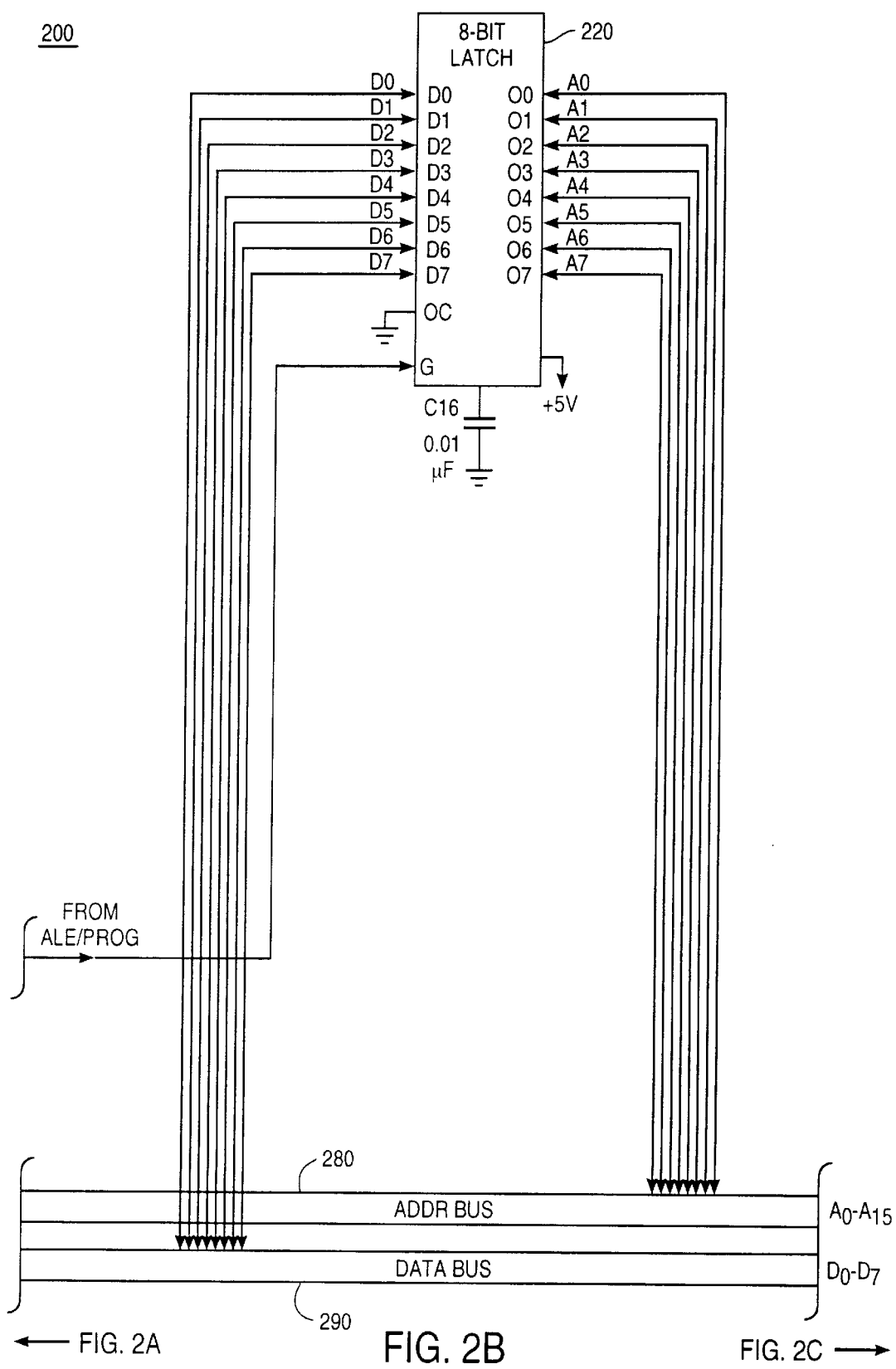
Figure 2D:
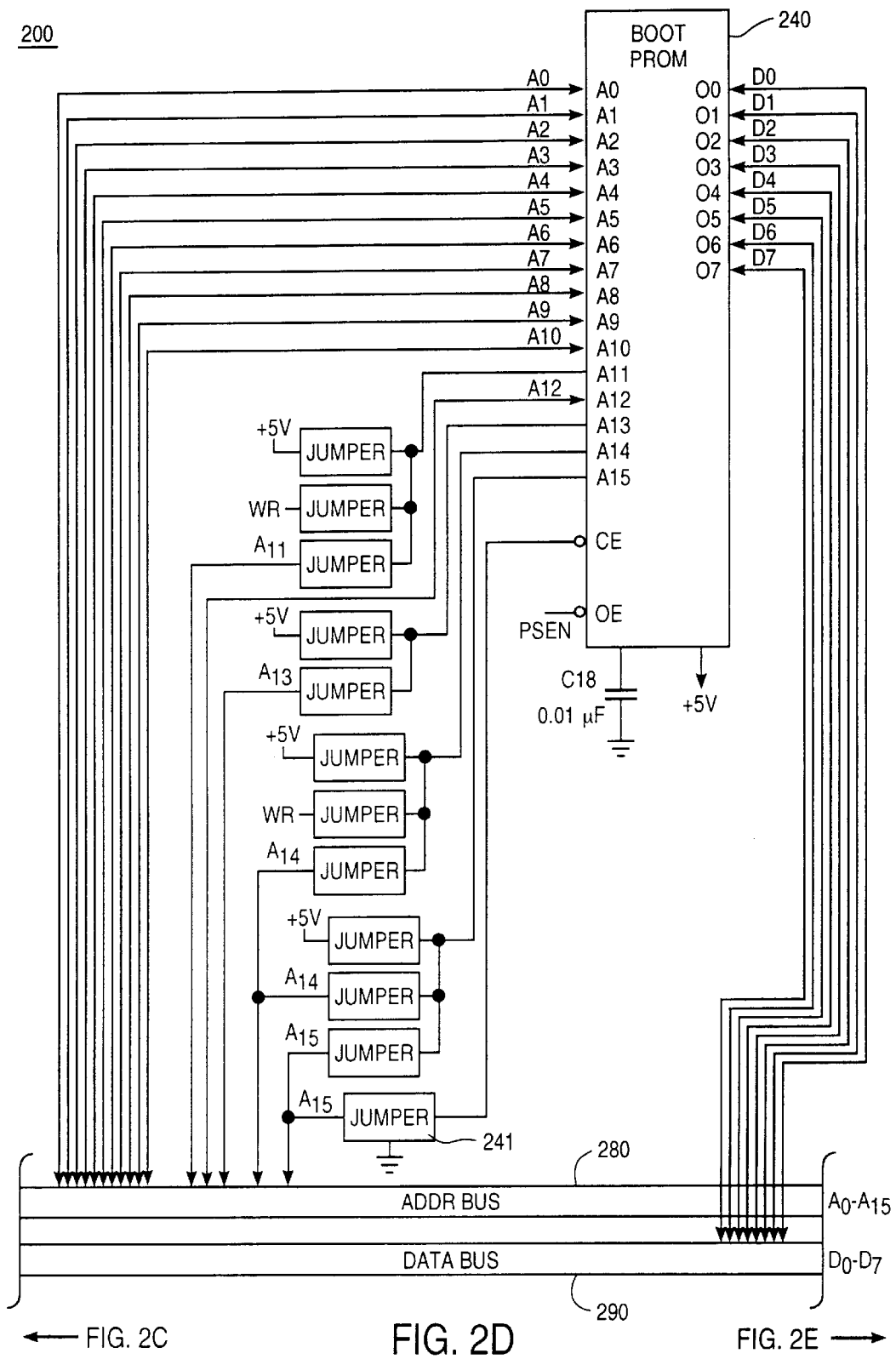
Figure 2E:
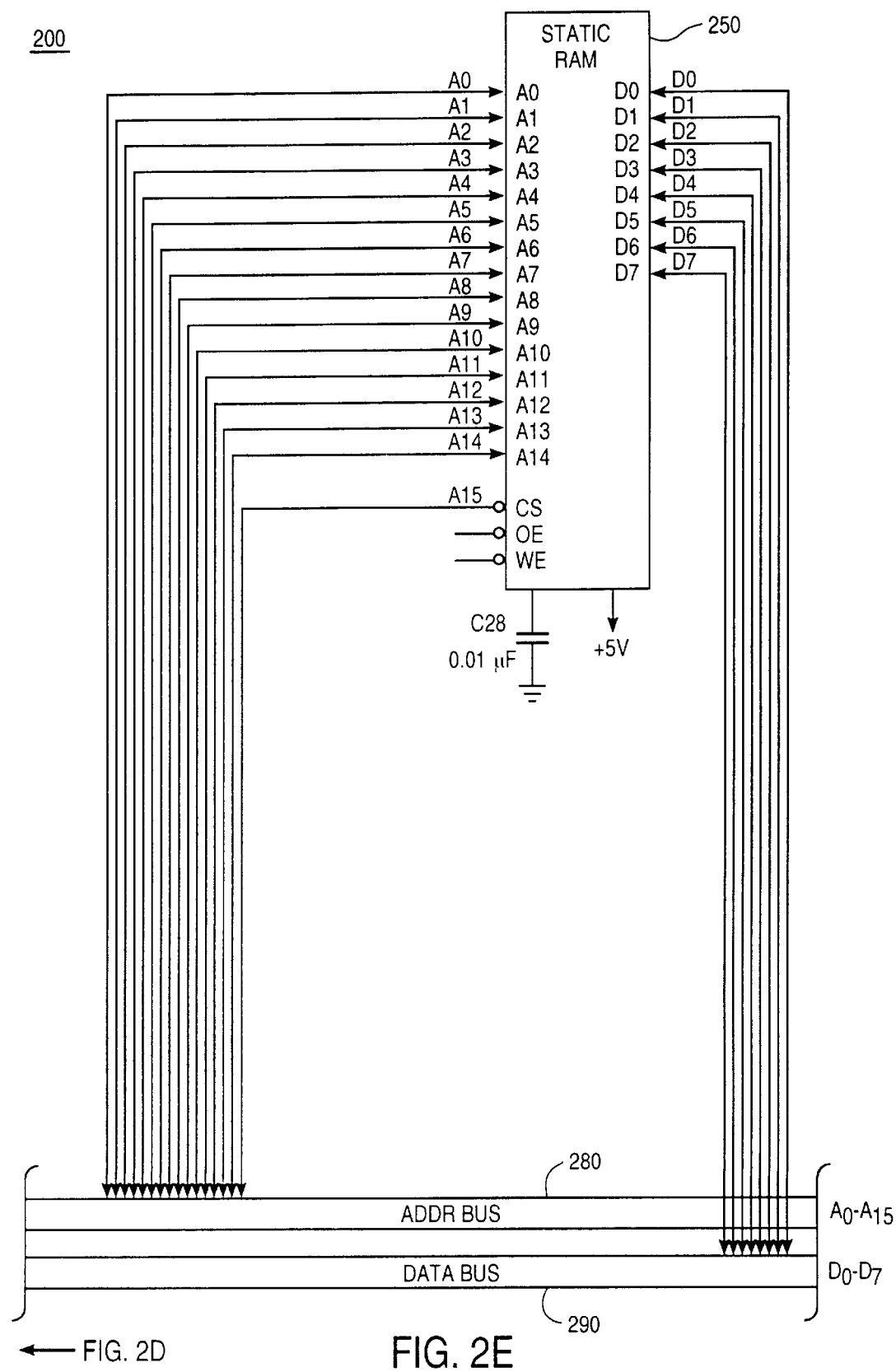

Latch 220 enable remote controller 200 to store the lower address bits of PROM 340. PROM 340 can be used to store program code such as bootstrap code. As shown in FIG. 2D, jumper 241 is used to select the size and type of PROM 240, e.g. with respect to its address space.

Referring back to FIG. 1A, remote controller 200 monitors and controls the plurality of systems 121, 122, . . . 129 via power sensors 410, 420, . . . 490 and power controllers 310, 320, . . . 390, respectively. As discussed above, other statuses such as ambient temperature may be monitored in place of or in addition to the power source(s).

Figure 3:
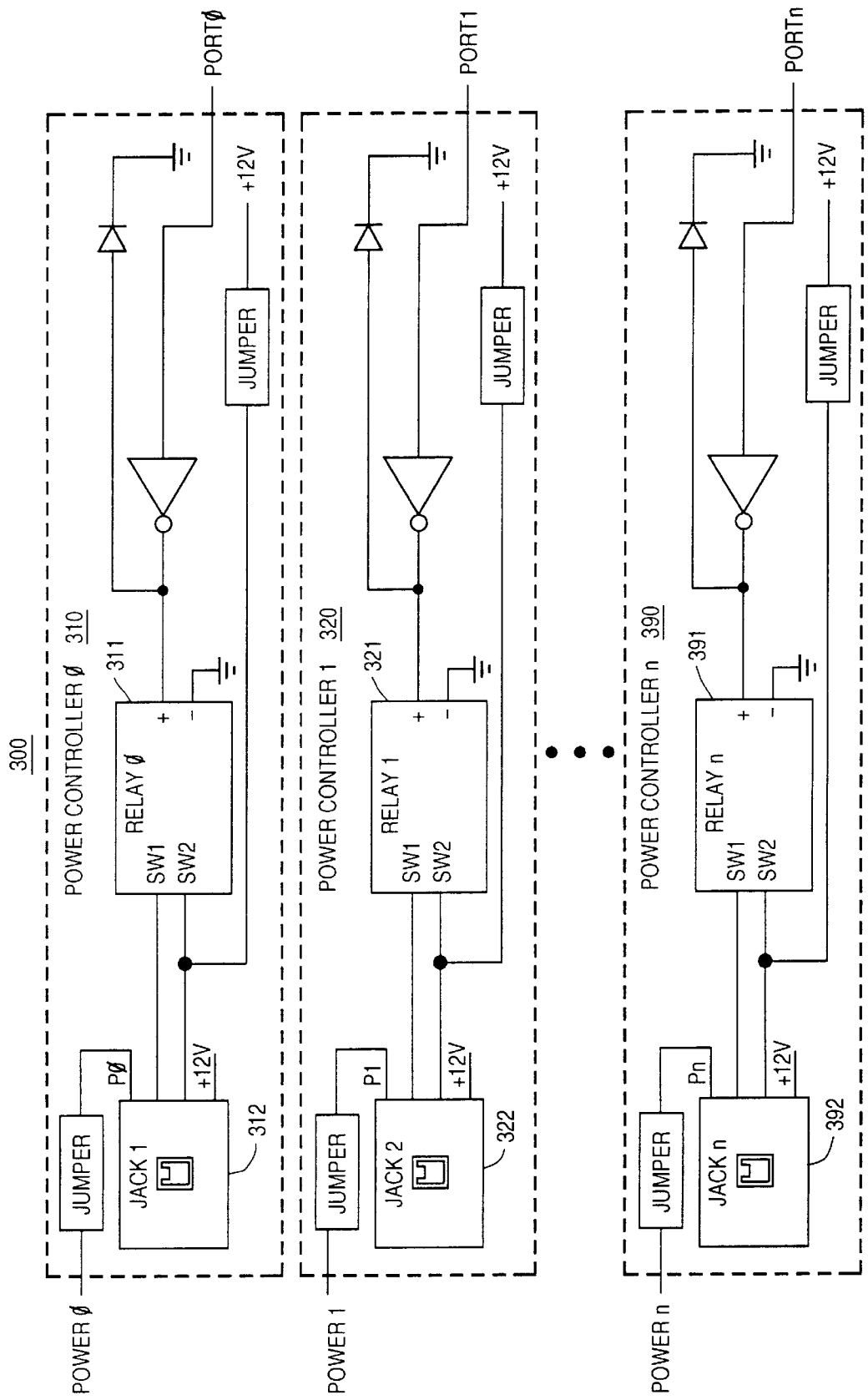
FIG. 3 is a detailed block diagram of a power-control circuitry of the remote controller.

FIG. 3 is a detailed block diagram of power-control circuitry 300 of remote controller 200 which includes power controllers 310, 320, . . . 390, for remotely controlling up to n+1 systems under the direction of control signals PORT0, PORT1, . . . PORTn, respectively. Each power controller includes a relay and a jack for coupling/uncoupling the respective power source to/from each system. For example, power controller 310 includes relay 311 and jack 312 for powering up/down system 121. Hence, power-control circuitry 300 provides remote controller 200 with a great deal of flexibility in powering up/down systems 121, 122, . . . 129.

Figure 4:
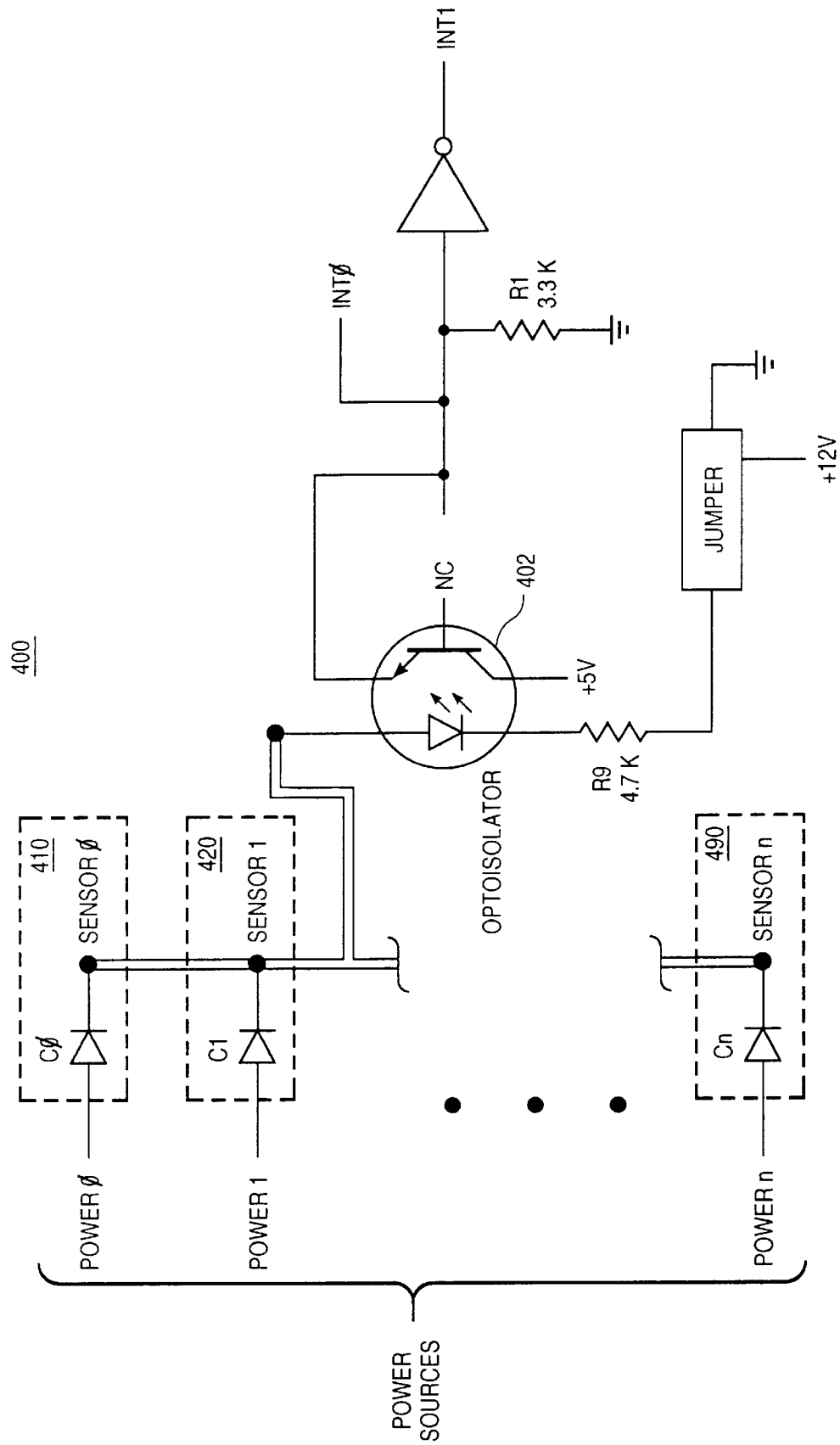
FIG. 4 illustrates a power-sensing circuitry of the remote controller.

FIG. 4 illustrates power-sensing circuitry 400 of remote controller 200 which includes power sensors 410, 420, . . . 490, for remotely sensing up to n+1 power sources. By monitoring the power statuses of systems 121, 122, . . . 129, remote controller 200 can exercise intelligent control of the systems 121, 122, . . . 129. For example, in the event of a brown-out which may indicate an impending power outage, remote controller 200 can send a message to system 121, which can then propagate the brown-out warning to systems 122, . . . 129 via LAN 190. Systems 121, 122, . . . 129 can then gracefully backup data in anticipation of a shutdown. In this embodiment, sensors 410, 420, . . . 490 are coupled to and share the same optoisolator. If more granularity or better response time is needed, separate optoisolators may be used for each power sensor.

Figure 5:
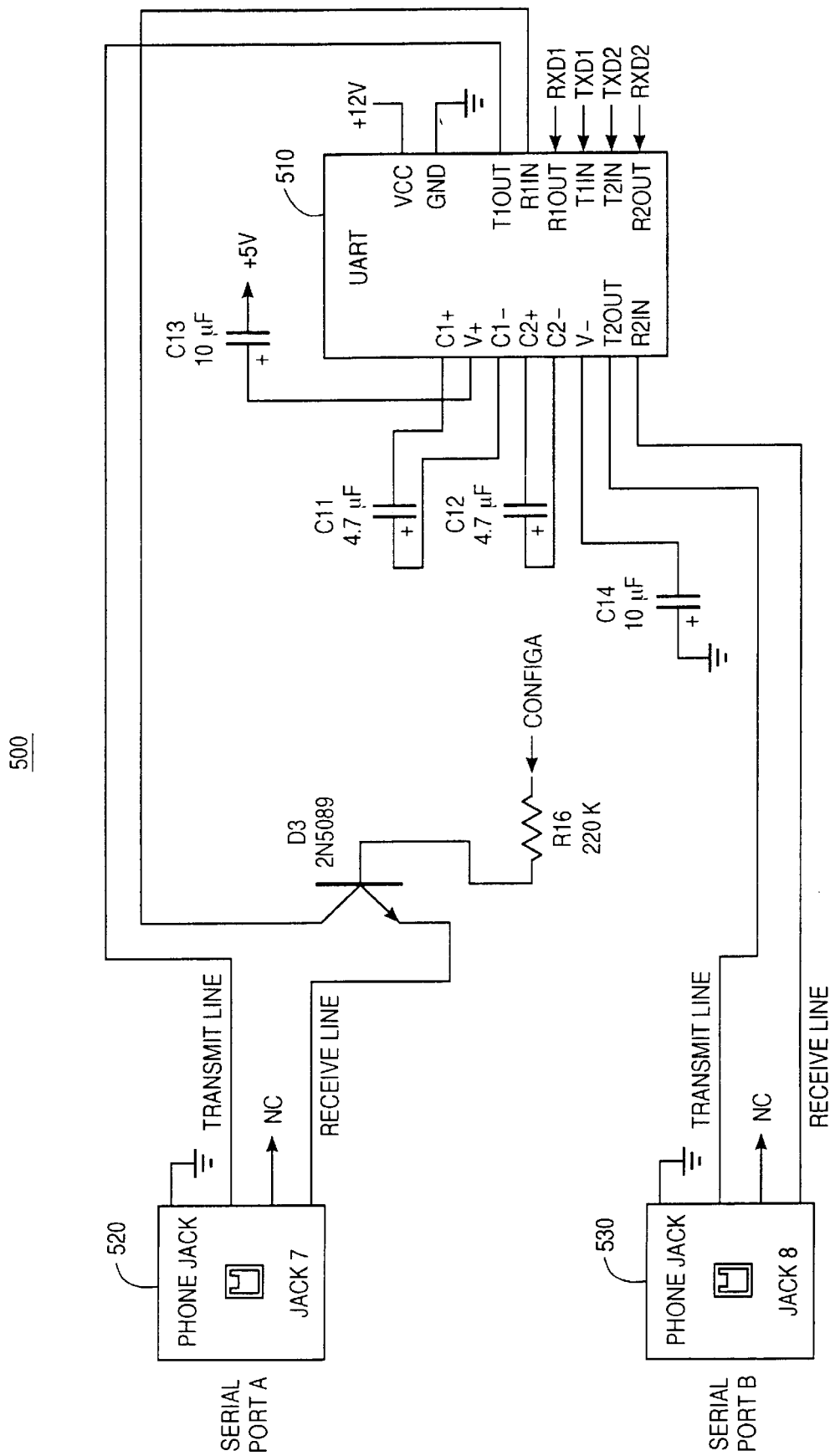
FIG. 5 is a circuit diagram showing a communication circuitry of the remote controller.
Figure 6:
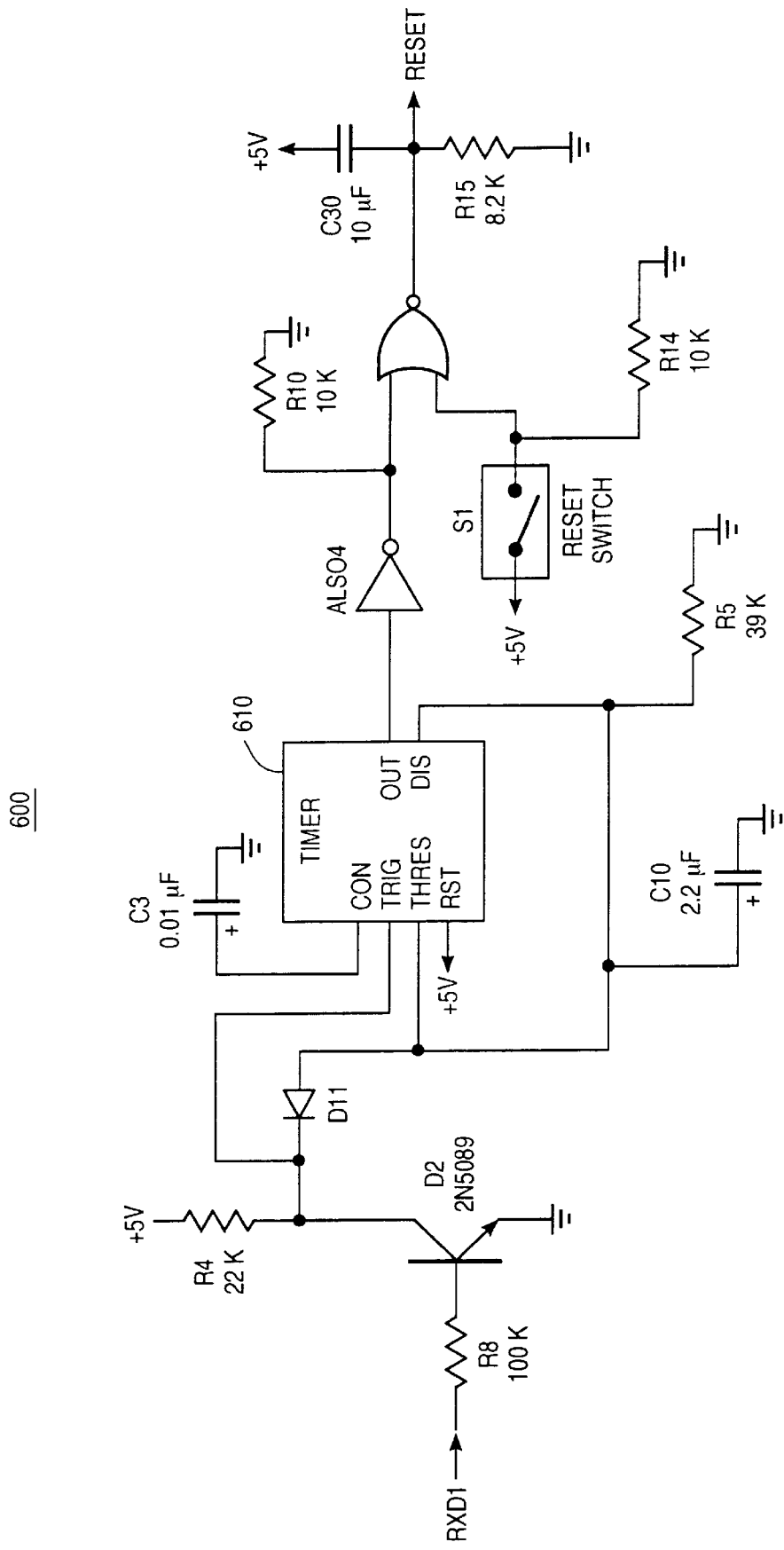
FIG. 6 shows an exemplary reset circuit for the remote controller.

FIG. 5 is a circuit diagram showing communication circuitry 500 with two serial interfaces, a pair of RS-232 ports 520 and 530 coupled to a dual-channel RS-232 driver 510, for communicating with primary control system 110. FIG. 6 shows the exemplary reset circuit 600 for remote controller 200.

Figure 7:
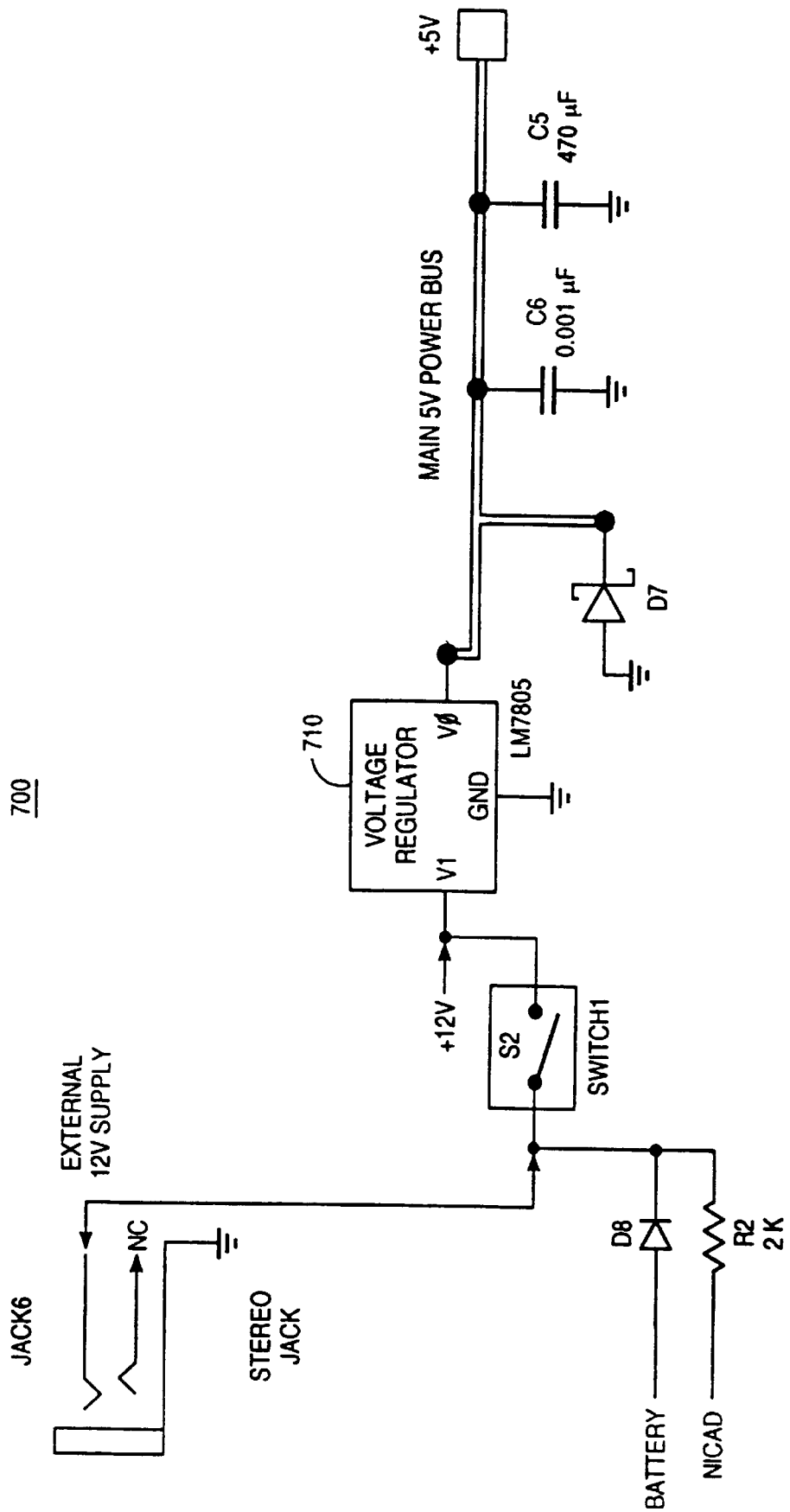
FIG. 7 is a circuit diagram of a voltage regulator and a backup power supply for the remote controller.

FIG. 7 is a circuit diagram of voltage regulator and backup power supply 700 of remote controller 200. An external 12 volt supply is coupled to voltage regulator 710. Backup power is provided by both a conventional battery and/or a rechargeable battery such as a NiCd battery.

The following table includes an exemplary list of integrated circuits for remote controller 200:

| | |
|---|---|
| Microprocessor 210 | DS80C320 |
| Latch 220 | 74HC373 |
| NV RAM 230 | AT29C256 |
| Boot PROM 240 | 27C64 |
| Static RAM 250 | KM62256 |
| Optoisolator 402 | 4N26 |
| UART 510 | MAX232 |

-continued

| | |
|---|---|
| Timer 610 | LMC555 |
| Voltage Regulator 710 | LM7805 |

Other modifications are possible without departing from the spirit of the invention. For example, the remote controller of the present invention can be adapted for regular maintenance and diagnostics. Accordingly, the scope of the invention should be determined by the following claims.

What is claimed is:

1. A method for remotely controlling a plurality of systems, said method comprising:
    receiving control instructions passing through a pre-existing communication channel of the plurality of systems;
    processing said control instructions by a remote controller;
    directly sensing a first change in a status of a first system of said plurality of systems, said sensing being separate from said receiving and said processing, said status directly relating to the control instructions; and
    upon sensing said first change, altering the status of said first system by transferring a message to a selected system of the plurality of system, the message being in accordance with said control instructions for dissemination to the first system of the plurality of systems.

2. The method of claim 1 wherein said status is a voltage level of a primary power source associated with said first system, said first change is a lowering of said voltage level normally associated with a power outage or a brown-out of said primary power source.

3. The method of claim 1 further comprising:
    directly sensing a second change in the status of said first system; and
    upon sensing said second change, re-altering the status of said first system in accordance with said control instructions.

4. The method of claim 3 wherein said status is a voltage level of a primary power source associated with said first system, said first change is a lowering of said voltage level normally associated with a power outage or a brown-out of said primary power source.

5. The method of claim 4 wherein said primary power supply is also coupled to a second system of said plurality of systems, and said altering and re-altering acts also decouple and recouple said power supply to and from said second system, respectively.

6. The method of claim 1 further comprising reprogramming said remote controller.

7. The method of claim 6 wherein said reprogramming includes:
    transmitting additional control instructions through the pre-existing communicate channel; and
    receiving and processing said additional control instructions by said remote controller.

8. Adapted to a plurality of systems, a remote controller comprising:
    a communication interface circuit configured to receive control instructions through a pre-existing communication channel;
    a processor coupled to the communication interface circuit, said processor being configured to process said control instructions;
    a first sensor physically separate from said communication interface circuit and said processor and coupled to said processor, the first sensor being adapted to a first system of the plurality of systems and configured to directly sense a change in a status of any of said plurality of systems, said status directly relating to the control instructions; and
    a first controller coupled to said processor and adapted to the first system, the first controller being configured to alter said status of the first system in accordance said control instructions.

9. The remote controller of claim 8 wherein said status is a voltage level of a primary power source associated with said first system, said change is a lowering of said voltage level normally associated with a power outage or a brown-out of said primary power source, and said first controller is a switch for coupling/decoupling said first system to/from said power source.

10. The remote controller of claim 8 further comprising:
    a second sensor configured to directly sense a change in a status of a second system of said plurality of systems; and
    a second controller configured to alter the status of said second system in accordance with said control instructions.

11. The remote controller of claim 10 wherein said status is respective voltage levels of primary power sources associated with said first and second systems, said change is a lowering of said voltage levels normally associated with a power outage or a brown-out of said primary power sources, and said first and second controllers are switches for coupling/decoupling said first and second systems to/from said power sources.

12. The remote controller of claim 8 further comprising a reprogrammable memory configured to store said control instructions.

13. Adapted to control a plurality of systems, a remote controller comprising:
    a tap connector attached to a pre-existing communication channel to allow a control instruction to be routed to both a first system of the plurality of systems and a communication interface circuit;
    a processor coupled to the communication interface circuit to receive the control instruction, the processor being configured to process the control instruction;
    a first sensor physically separate from said communication interface circuit and said processor, and coupled to said processor and adapted to the first system, said first sensor being configured to directly sense a change in a status of the first system, said status directly relating to the control instructions; and
    a first controller coupled to said processor and adapted to the first system, the first controller being configured to alter the status of the first system in accordance said control instructions.

14. The method of claim 1, wherein altering of the status of the first system includes decoupling the first system from the power source.

15. The method of claim 3 wherein said status is a voltage level of a primary power source associated with said first system, said first change is a lowering of said voltage level normally associated with a power outage or a brown-out of said primary power source, said altering includes decoupling said first system from said power source, and wherein said second change is a rise of said voltage level normally associated with a return of power to said primary power source.

16. The method of claim 15 wherein said status is a voltage level of a primary power source associated with said first system, said first change is a lowering of said voltage level normally associated with a power outage or a brown-out of said primary power source, and said altering step includes the step of decoupling said first system from said power source, and wherein said second change is a rise of said voltage level normally associated with a return of power to said primary power source, said re-altering includes recoupling said first system to said power source.

17. Adapted to a plurality of systems, a remote controller comprising:
- a communication interface circuit configured to receive control instructions through a pre-existing communication channel;
- a processor coupled to the communication interface circuit, the processor configured to process the control instructions;
- a plurality of sensors separate from the communication interface circuit and the processor and coupled to the processor and to a selected system of the plurality of systems, each of the plurality of sensors further configured to directly sense a change in a status of the selected system, said status directly relating to the control instructions; and
- a plurality of controllers each coupled to the processor and to a corresponding system of the plurality of systems, each of the plurality of controllers configured to alter the status of the corresponding system.

18. The method of claim 1, wherein the first system is the selected system.

19. The method of claim 1, wherein the first system is different than the selected system.

* * * * *